United States Patent
Kasai

(10) Patent No.: US 8,388,176 B2
(45) Date of Patent: Mar. 5, 2013

(54) LIGHT SOURCE DEVICE AND DISPLAY DEVICE

(75) Inventor: Nobuhiro Kasai, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 156 days.

(21) Appl. No.: 12/993,255

(22) PCT Filed: Mar. 19, 2009

(86) PCT No.: PCT/JP2009/055438
§ 371 (c)(1),
(2), (4) Date: Nov. 18, 2010

(87) PCT Pub. No.: WO2009/142057
PCT Pub. Date: Nov. 26, 2009

(65) Prior Publication Data
US 2011/0116273 A1    May 19, 2011

(30) Foreign Application Priority Data
May 21, 2008   (JP) ................................ 2008-132729

(51) Int. Cl.
*B60Q 1/26* (2006.01)
(52) U.S. Cl. .. 362/232; 362/97.4; 362/233; 362/311.01; 362/632; 362/634
(58) Field of Classification Search ........ 362/97.1–97.2, 362/97.4, 232–233, 269, 285, 311.01, 632–634; 349/59–60
See application file for complete search history.

(56) References Cited

U.S. PATENT DOCUMENTS
7,198,819 B2 * 4/2007 Kang ............................ 427/148
2003/0043312 A1 * 3/2003 Nishida et al. .................. 349/58
2006/0072343 A1 4/2006 Shimizu FOREIGN PATENT DOCUMENTS
| JP | 11-337942 A | 12/1999 |
| JP | 2005-44747 A | 2/2005 |
| JP | 2005-135670 A | 5/2005 |
| JP | 2008-66046 A | 3/2008 |
| JP | 2008-90094 A | 4/2008 |
| WO | 2007/132597 A1 | 11/2007 |

OTHER PUBLICATIONS

Official Communication issued in International Patent Application No. PCT/JP2009/055438, mailed on Jun. 2, 2009.

* cited by examiner

Primary Examiner — Meghan Dunwiddie
(74) Attorney, Agent, or Firm — Keating & Bennett, LLP

(57) ABSTRACT

A light source device and a display device in which wrinkle or warpage of sheet-shaped or film-shaped optical members is prevented or minimized. A light source device (2b) includes sheet-shaped or film-shaped optical members (26a, 26b, 26c) arranged to control properties of light that passes therethrough and a chassis (11b) to which the sheet-shaped or film-shaped optical members (26a, 26b, 26c) are attached, the chassis (11b) includes a plurality of fitting protrusions (hooks) (114a, 114b, 114c) that are vertically movable and are pushed upward by pushing mechanisms in a normal usage state, a plurality of fitting holes (261) each having a through hole shape are disposed adjacent to upper sides of the sheet-shaped or film-shaped optical members (26a, 26b, 26c) in the normal usage state, and the optical members (26a, 26b, 26c) are hung on the fitting protrusions (114a, 114b, 114c) of the chassis (11b) in the fitting holes (261).

6 Claims, 8 Drawing Sheets

LIGHT SOURCE DEVICE AND DISPLAY DEVICE

TECHNICAL FIELD

The present invention relates to a light source device and a display device, and specifically relates to a light source device for a display device that includes a light source and a sheet-shaped or film-shaped optical member arranged to control the properties of light the light source emits and a display device including the light source device.

BACKGROUND ART

A display device having a non-self-emissive display panel such as a translucent liquid crystal display panel generally has such a configuration that a light source device for a display device that includes a light source is disposed on the back side of the display panel. The light source device includes the light source and a given number of sheet-shaped or film-shaped optical members of given type that are arranged to control the properties of light the light source emits. The light source device projects the light the properties of which have been controlled by the optical members toward the back side of the display panel. The light projected toward the back side of the display panel is transmitted through the display panel, making an image displayed visible on the front side of the display panel.

Examples of the sheet-shaped or film-shaped optical members include a diffusion sheet having a function of diffusing light and a lens sheet having a light gathering function. In order to support the sheet-shaped or film-shaped optical members, a given number of through holes are disposed adjacent to upper sides of the sheet-shaped or film-shaped optical members in a normal usage state, convex hooks are disposed adjacent to an upper side of a chassis of the light source device, and the hooks are fit in the through holes of the sheet-shaped or film-shaped optical members so as to hang the sheet-shaped or film-shaped optical members on the hooks. In particular, a plurality of through holes are provided to the sheet-shaped or film-shaped optical members, a plurality of hooks are provided to the chassis of the light source device, and bosses of the hooks are fit in the through holes so as to hang the sheet-shaped or film-shaped optical members (in other words, the sheet-shaped or film-shaped optical members are hung on the plurality of hooks).

If wrinkle or warpage occurs in the sheet-shaped or film-shaped optical members, the wrinkle or warpage causes irregular brightness or shadow on the front side (screen) of the display panel. The irregular brightness or shadow could decrease display quality of the display device. Accordingly, it is preferable to keep the sheet-shaped or film-shaped optical members with no wrinkle or warpage.

In the configuration that the plurality of through holes are disposed adjacent to the upper sides of the sheet-shaped or film-shaped optical members in the normal usage state and the bosses are fit in the through holes so as to hang the sheet-shaped or film-shaped optical members, the weight of the sheet-shaped or film-shaped optical members is dispersed to the peripheral portions of the plurality of through holes. Thus, occurrence of wrinkle or warpage in the sheet-shaped or film-shaped optical members can be prevented or minimized.

However, this configuration may cause the following problem. The vertical positions of the through holes that are disposed adjacent to the upper sides of the sheet-shaped or film-shaped optical members in the normal usage state are not always precisely aligned. In addition, the vertical positions of the hooks protruding from the chassis of the light source device are not always aligned. Thus, there is a possibility that some of the hooks come into contact with the inner surfaces of the corresponding through holes, so that the weight of the sheet-shaped or film-shaped optical members is put on the peripheral portions of those through holes, and the other hooks do not come into contact with the inner surfaces of the corresponding through holes, so that the weight of the sheet-shaped or film-shaped optical members is not put on the peripheral portions of those through holes. In such a case, the weight of the sheet-shaped or film-shaped optical members is concentrated on the peripheral portions of the through holes that come into contact with the hooks, and wrinkle or warpage could occur in the sheet-shaped or film-shaped optical members.

In view of this, in the configuration that the plurality of through holes are provided to the sheet-shaped or film-shaped optical members and the plurality of hooks protruding from the chassis are disposed adjacent to the upper side of the chassis, the vertical positions of the plurality of through holes in the sheet-shaped or film-shaped optical members and the vertical positions of the plurality of hooks protruding from the chassis should be precisely aligned. However, it is actually difficult to precisely align the vertical positions of the plurality of through holes in the sheet-shaped or film-shaped optical members and the vertical positions of the plurality of hooks protruding from the chassis.

CITATION LIST

Patent Literature

JP H11-337942

SUMMARY OF INVENTION

Technical Problem

An object of the invention is to overcome the problems described above and to provide a light source device and a display device in which occurrence of wrinkle or warpage in a sheet-shaped or film-shaped optical member is prevented or minimized. Specifically, an object of the invention is to provide a light source device and a display device in which a plurality of through holes are provided in a sheet-shaped or film-shaped optical member and the sheet-shaped or film-shaped optical member is hung on a plurality of hooks, and accordingly, occurrence of wrinkle or warpage in the sheet-shaped or film-shaped optical member is prevented or minimized.

Solution to Problem

In order to overcome the problems described above, preferred embodiments of the present invention provide a light source device including a sheet-shaped optical member that is arranged to control properties of light that passes therethrough, and includes a plurality of fitting holes each having a shape of a through hole, the plurality of fitting holes being disposed adjacent to an upper side of the sheet-shaped optical member in a normal usage state, and a chassis to which the sheet-shaped optical member is attached, and that includes a plurality of fitting protrusions that are vertically movable and pushing mechanisms arranged to push the plurality of fitting protrusions upward in the normal usage state, wherein the sheet-shaped optical member is hung on the plurality of fitting protrusions of the chassis such that the plurality of fitting protrusions are fit in the plurality of fitting holes of the sheet-shaped optical member.

Preferred embodiments of the present invention also provide a light source device including a plurality of sheet-shaped optical members that are arranged to control properties of light that passes therethrough, and include a plurality of fitting holes each having a shape of a through hole and a plurality of loosely fitting holes, the plurality of fitting holes and the plurality of loosely fitting holes being disposed adjacent to upper sides of the plurality of sheet-shaped optical members in a normal usage state, and a chassis to which the plurality of sheet-shaped optical members are attached, and that includes a plurality of fitting protrusions that are vertically movable and pushing mechanisms arranged to pushing the plurality of fitting protrusions upward in the normal usage state, wherein one of the plurality of sheet-shaped optical members is hung on some of the plurality of fitting protrusions of the chassis such that the some of the plurality of fitting protrusions are fit in the plurality of fitting holes of the one of the sheet-shaped optical members, while some others or all others of the plurality of fitting protrusions of the chassis are loosely fit in the plurality of loosely fitting holes in the one of the sheet-shaped optical members, and another one of the sheet-shaped optical members is hung on the some others or the all others of the plurality of fitting protrusions of the chassis such that the some others or the all others of the plurality of fitting protrusions are fit in the plurality of fitting holes of the another one of the sheet-shaped optical members, and the some of the plurality of fitting protrusions of the chassis are loosely fit in the plurality of loosely fitting holes of the another one of the sheet-shaped optical members.

For the pushing mechanisms, coil springs or leaf springs are favorably used.

Preferred embodiments of the present invention also provide a display device that includes the light source device described above and a liquid crystal display panel.

Advantageous Effects of Invention

According to the preferred embodiments of the present invention in which the fitting protrusions are vertically movable, even if the vertical positions of the fitting holes in the sheet-shaped or film-shaped optical members are not aligned, the fitting protrusions move vertically so as to fit in all of the fitting holes, so that the weight of the sheet-shaped or film-shaped optical members is put on all of the fitting holes. Specifically, a problem that some of the fitting protrusions come into contact with the inner surfaces of the corresponding fitting holes but the other fitting protrusions do not come into contact with the inner surfaces of the corresponding fitting holes is prevented or minimized. Thus, the weight of the sheet-shaped or film-shaped optical members is prevented from being put only on specific fitting holes, and the weight of the sheet-shaped or film-shaped optical members is dispersed substantially uniformly on the fitting protrusions. Consequently, occurrence of wrinkle or warpage in the sheet-shaped or film-shaped optical members is prevented or minimized.

By using the coil springs or the leaf springs for the pushing mechanisms, the fitting protrusions can be pushed upward easily at low cost.

In the configuration of using the plurality of sheet-shaped or film-shaped optical members, if the one of the plurality of sheet-shaped or film-shaped optical members is hung on the some of the plurality of fitting protrusions and the another one of the plurality of sheet-shaped or film-shaped optical members is hung on the some others or the all others of the plurality of fitting protrusions, occurrence of wrinkle or warpage in all of the sheet-shaped or film-shaped optical members can be prevented. Consequently, the present invention is applicable also to the configuration of using the plurality of sheet-shaped or film-shaped optical members.

Because occurrence of wrinkle or warpage in the sheet-shaped or film-shaped optical members is prevented or minimized in the display device according to the present invention, occurrence of irregular brightness or shadow that is caused by wrinkle or warpage in the sheet-shaped or film-shaped optical members can be prevented or minimized.

DESCRIPTION OF EMBODIMENTS

A detailed description of preferred embodiments of the present invention will now be provided with reference to the accompanying drawings.

Figure 1:
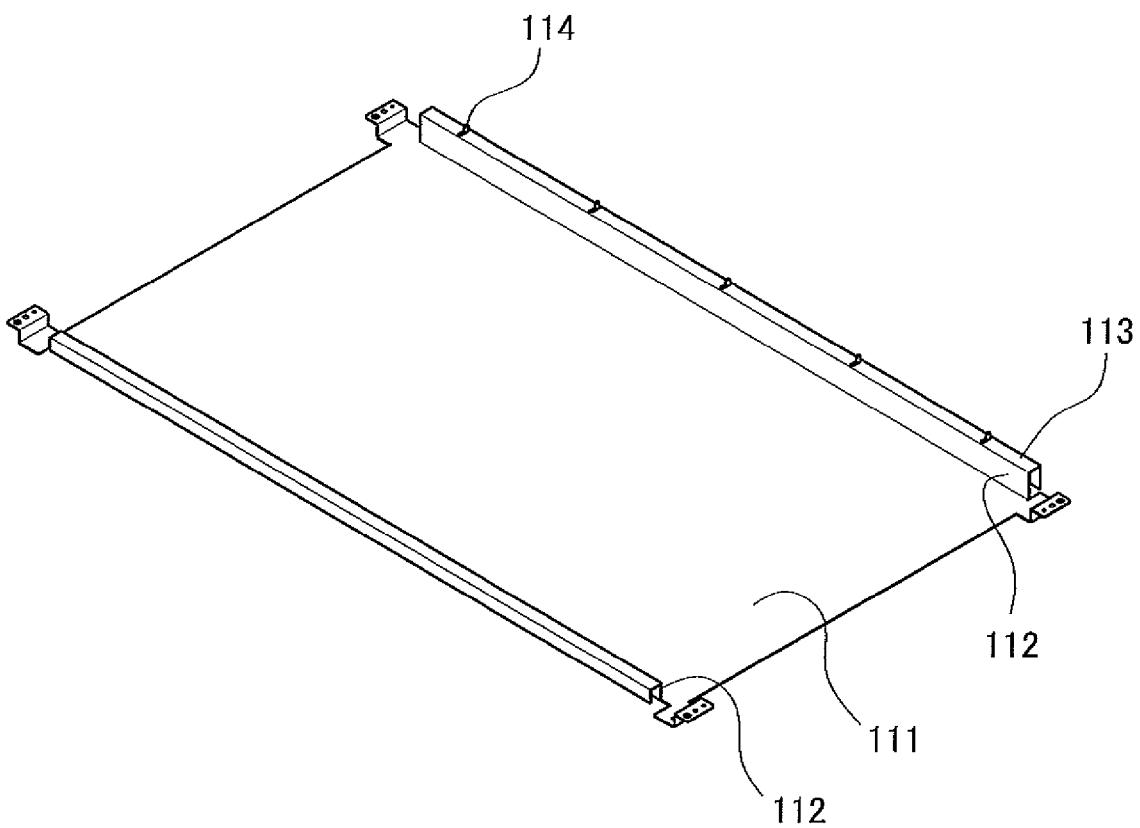
FIG. 1 is an external perspective view showing a schematic configuration of a chassis for a light source device according to a preferred embodiment of the present invention.

FIG. 1 is an external perspective view showing a schematic configuration of a chassis 11a for a light source device according to a first preferred embodiment of the present invention. The chassis 11a has the shape of a substantially square tray of low height. One of the longer sides of the four sides of the chassis 11a is defined as an upper side in a normal usage state, and the other longer side is defined as a lower side in the normal usage state. The shorter sides of the chassis 11a are defined as lateral sides in the normal usage state. It should be noted that the "normal usage state" refers to the state of the light source device or a display device when they are normally used. In FIG. 1, the front side of the chassis 11a faces toward the top of FIG. 1, and the back side faces toward the bottom of FIG. 1.

As shown in FIG. 1, the chassis 11a includes a bottom 111 having a substantially planar surface, and side walls 112 disposed along the longer sides of the bottom 111. The side walls 112 are formed by bending to raise the longer sides of the chassis 11a toward the front side of the chassis 11a. Support faces 113 that are substantially parallel to the bottom 111 are provided at the top ends of the side walls 112. The support faces 113 have a configuration such that the longer sides of an optical member having a thin plate shape (described later) are to be placed thereon.

A plurality of vertically movable fitting protrusions (hooks) 114 are disposed in a manner protruding toward the front side through the support face 113 that is to be positioned on the upper side in the normal usage state. For example, the plurality of vertically movable fitting protrusions (hooks) 114 are disposed at substantially regular intervals in a direction of the longer sides.

Figure 2:
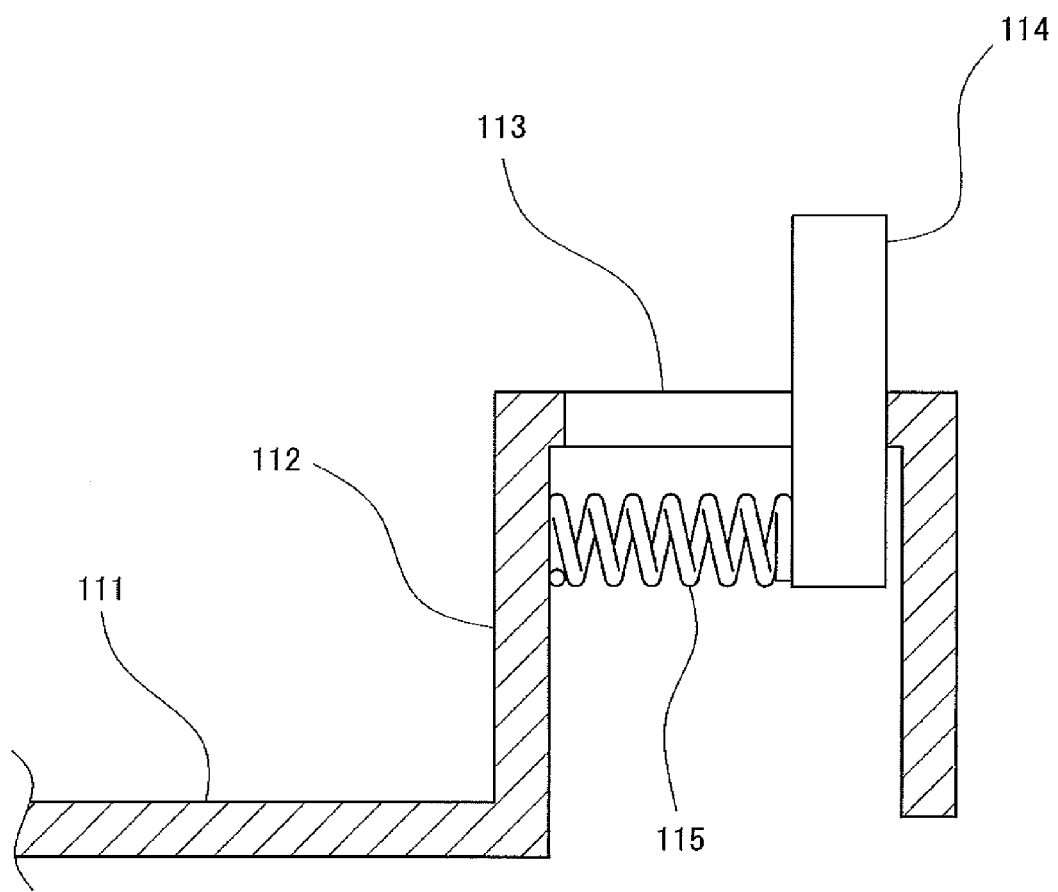
FIG. 2 is a sectional view showing a schematic configuration of fitting protrusions (hooks) provided to the chassis of the light source device according to the preferred embodiment of the present invention.

FIG. 2 is a sectional view showing a schematic configuration of the vertically movable fitting protrusions (hooks) 114. As shown in FIG. 2, the vertically movable fitting protrusions (hooks) 114 are members having a substantially bar shape. The fitting protrusions (hooks) 114 protrude toward the front side through the support face 113 of the chassis 11a. The tip ends of the fitting protrusions (hooks) 114 (portions of the fitting protrusions (hooks) 114 that protrude toward the front side from the support face 113 of the chassis 11a) are arranged to hang a sheet-shaped or film-shaped optical member. The base ends of the fitting protrusions (hooks) 114 are located on the back side of the support face 113 of the chassis 11a. The base ends of the fitting protrusions (hooks) 114 are pushed upward by pushing mechanisms (e.g., coil springs 115) in the normal usage state.

The fitting protrusions (hooks) 114 are integrally pushed upward, and the fitting protrusions (hooks) 114 act to move upward against the weight of the sheet-shaped or film-shaped optical member when the sheet-shaped or film-shaped optical member is hung. In other words, the fitting protrusions (hooks) 114 are moved downward by the weight of the sheet-shaped or film-shaped optical member when the sheet-shaped or film-shaped optical member is hung. The movement of the fitting protrusions (hooks) 114 stops at a position that the upwardly pushing force of the pushing mechanisms (coil springs) 115 and the weight of the sheet-shaped or film-shaped optical member are in balance.

With this configuration, the fitting of the fitting protrusions (hooks) 114 protruding from the chassis 11a in a plurality of fitting holes in the sheet-shaped or film-shaped optical member brings about a state that the sheet-shaped or film-shaped optical member is hung on the fitting protrusions (hooks) 114. Even if the vertical positions of the plurality of fitting holes in the sheet-shaped or film-shaped optical member are not precisely aligned, the fitting protrusions (hooks) 114 move vertically so that the inner surfaces of the plurality of fitting holes and the fitting protrusions (hooks) 114 come into contact with one another, and the weight of the sheet-shaped or film-shaped optical member is dispersed to the peripheral portions of the plurality of fitting holes.

As described above, even if the vertical positions of the plurality of fitting holes in the sheet-shaped or film-shaped optical member are not precisely aligned, concentration of the weight of the sheet-shaped or film-shaped optical member on the peripheral portions of specific fitting holes in the sheet-shaped or film-shaped optical member can be prevented or minimized. Accordingly, occurrence of wrinkle or warpage caused by concentration of the weight can be prevented or minimized.

The number of fitting protrusions (hooks) 114 is not specifically limited and may be determined appropriately in accordance with the size or weight of the sheet-shaped or film-shaped optical member.

Figure 3:
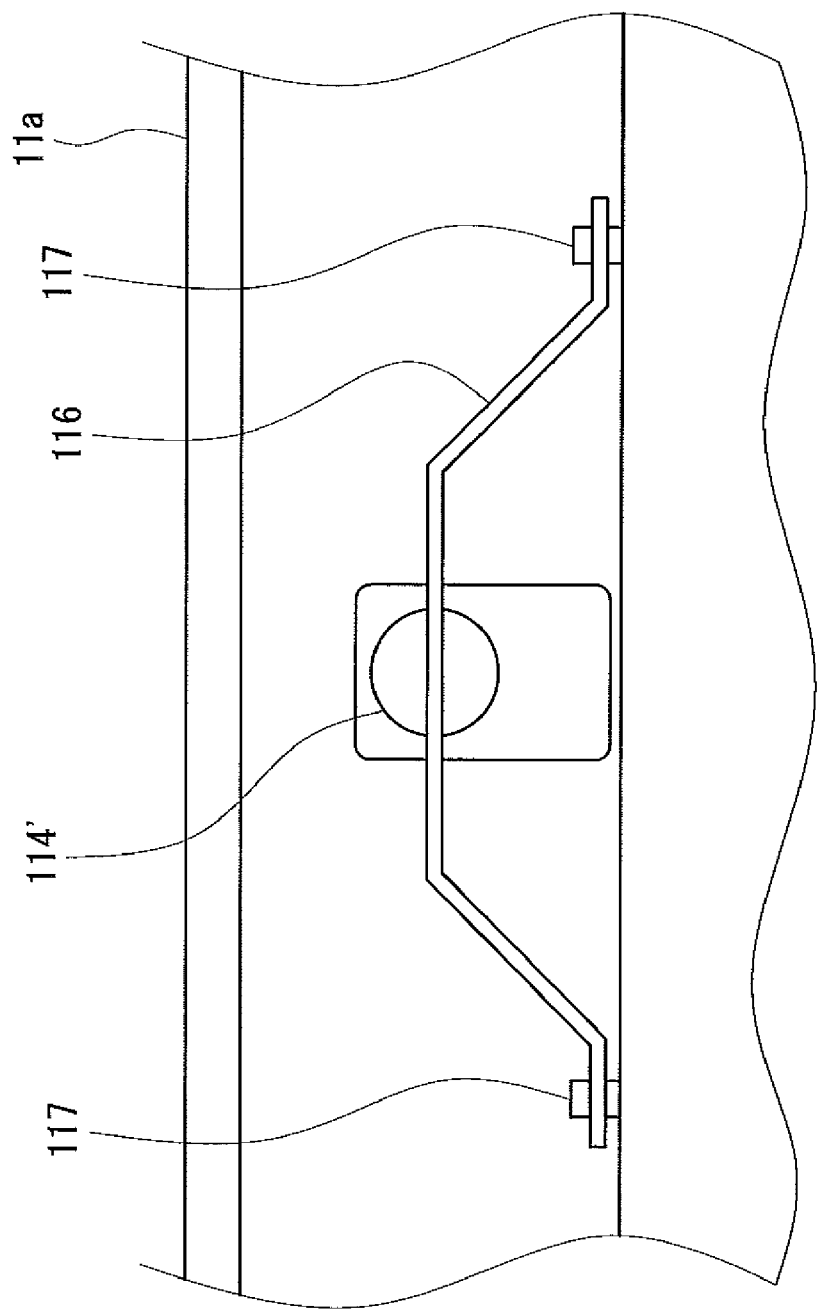
FIG. 3 is a plan view showing a schematic configuration of fitting protrusions (hooks) provided to a chassis of a light source device according to another preferred embodiment of the present invention.

The configuration of the fitting protrusions (hooks) is not limited to the configuration described above. FIG. 3 is a plan view showing a schematic configuration of fitting protrusions (hooks) 114' that are provided to a chassis for alight source device according to a modified preferred embodiment of the present invention. As shown in FIG. 3, the fitting protrusions (hooks) 114' according to the modified preferred embodiment of the present invention are members having a substantially bar shape. The top ends of the fitting protrusions (hooks) 114' protrude toward the front side from the support face 113 of the chassis 11a. The top ends of the fitting protrusions (hooks) 114' are arranged to hang the sheet-shaped or film-shaped optical member. The base ends of the fitting protrusions (hooks) 114' are located on the back side of the support face 113 of the chassis 11a. The base ends of the fitting protrusions (hooks) 114' are pushed upward by pushing mechanisms (leaf springs 116) in the normal usage state. Specifically, as shown in FIG. 3, both ends of the leaf springs 116 are fixed by leaf spring fixing members 117 that are provided to the chassis 11a. A groove is provided to the base end portion of each fitting protrusion (hook) 114', and a middle portion of the leaf spring 116 is engaged in the groove. Thus, the fitting protrusions (hooks) 114' are held by the leaf springs 116 and are pushed upward by the leaf springs 116.

This configuration provides almost the same action and effect as the configuration of using the coil springs. As described above, it is essential only the fitting protrusions be pushed upward, and the configuration of the fitting protrusions is not specifically limited.

Figure 4:
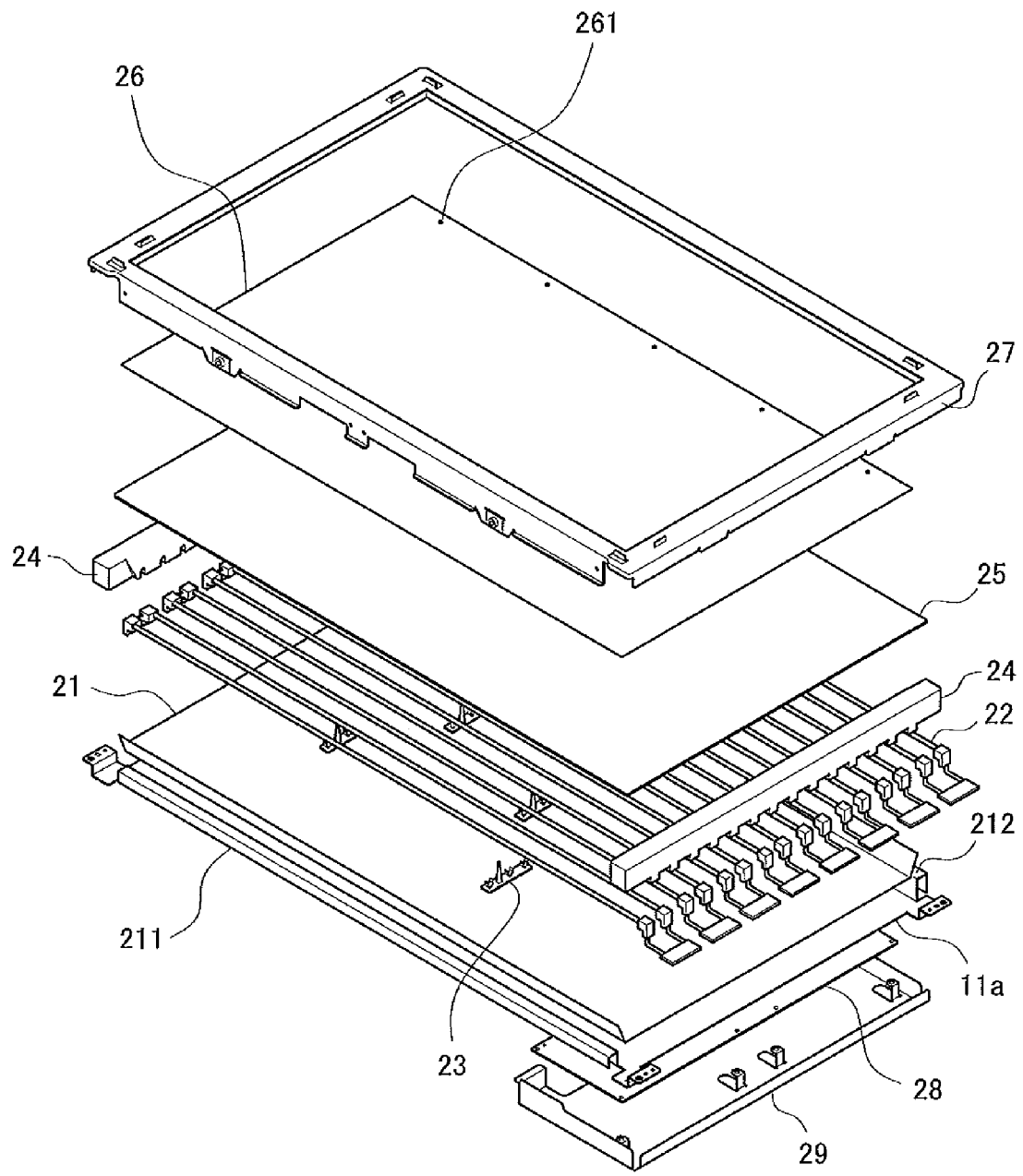
FIG. 4 is an exploded perspective view showing a schematic configuration of a light source device according to a first preferred embodiment of the present invention.

Next, a description of a light source device 2a including the chassis 11a according to the preferred embodiment of the present invention is provided. FIG. 4 is an exploded perspective view showing a schematic configuration of a light source device including the chassis 11a according to the preferred embodiment of the present invention (i.e., the light source device 2a according to a first preferred embodiment of the present invention). In FIG. 4, the front side of the light source device 2a according to the first preferred embodiment of the present invention faces toward the top of FIG. 4, and the back side faces toward the bottom of FIG. 4.

The light source device 2a according to the first preferred embodiment of the present invention includes the chassis 11a according to the preferred embodiment of the present invention, a reflection sheet 21, light sources 22, lamp clips 23, side holders 24, an optical member 25 having a thin plate shape, a sheet-shaped or film-shaped optical member 26, a frame 27, a light source driving circuit board 28, and a light source driving circuit board cover 29. The configuration of the chassis 11a according to the preferred embodiment of the present invention is as described above.

The reflection sheet 21 has a sheet, film, or plate shape, and has the surface property of diffusely reflecting light. The reflection sheet 21 is preferably made from expanded PET (polyethylene terephthalate).

The light sources 22 are capable of emitting light with a given wavelength. A variety of conventional light sources can be used for the light sources 22. Examples of the conventional light sources include a fluorescent tube such as a cold cathode fluorescent tube and a hot cathode fluorescent tube, a discharge lamp such as a xenon lamp, and a light emitting element such as an LED (Light Emitting Diode). The light source device 2a shown in FIG. 4 has a configuration of including linear fluorescent tubes as the light sources 22. However, the present invention is not limited to this configuration.

The lamp clips 23 are arranged to hold and fix the light sources 22 to the chassis 11a, and function as spacers for providing space between the thin-plate-shaped optical member 25 and the light sources 22. Each of the lamp clips 23 has a monolithic construction preferably made from a resin material.

The side holders 24 are members having a substantially bar shape. Each of the side holders 24 has a monolithic construction preferably made from a resin material. The side holders 24 cover both end portions (electrode portions) of the light sources 22 and function as spacers on which the thin-plate-shaped optical member 25 is to be placed.

A diffusion plate is preferably used as the thin-plate-shaped optical member 25. The diffusion plate is arranged to randomly diffuse light that passes therethrough, allowing uniformalization of brightness distribution in a surface direction of the light a light source emits. The diffusion plate is made from a nearly clear resin material that is a base material, in which fine particles having the property of reflecting light are mixed. The diffusion plate has a thin plate shape by being subjected to injection molding, for example.

A diffusion sheet, a lens sheet, or a reflective polarizing sheet is preferably used for the sheet-shaped or film-shaped optical member 26. Fitting holes 261 in which the fitting protrusions (hooks) 114 protruding from the chassis 11a are to be fit are disposed adjacent to one longer side (the upper side in the normal usage state) of the sheet-shaped or film-shaped optical members 26. The number, size, position, and shape of the fitting holes 261 are determined in accordance with those of the fitting protrusions (hooks) 114 protruding from the chassis 11a. The sheet-shaped or film-shaped optical members 26 suffice if it has a configuration of being hung on the fitting protrusions (hooks) 114.

The diffusion sheet is arranged to randomly diffuse light that passes therethrough, allowing uniformalization of brightness distribution in the surface direction of the light. The diffusion plate is made from a nearly clear material that is a base material, in which fine particles having the property of reflecting light are mixed, and is formed into a sheet or film shape. The nearly clear base material is preferably PET (polyethylene terephthalate).

The lens sheet has a layer structure made up of a base layer, and a layer of a given cross-sectional shape that has a light gathering function. The base layer is preferably made from PET (polyethylene terephthalate). The layer having the light gathering function is preferably made from an acrylic resin. The lens sheet has the function of gathering the light that passes therethrough in order to enhance brightness of the light.

The reflective polarizing sheet (also referred to as a brightness enhancement sheet) is arranged to transmit light that is polarized in a given direction (i.e., light that vibrates in a given direction) and reflect light other than the polarized light. The reflective polarizing sheet is preferably a DBEF film (DBEF is a registered trademark of 3M COMPANY).

The frame 27 has the function of supporting and/or protecting a display panel, which is described later. As shown in FIG. 4, the frame 27 has a substantially square shape with an opening. The frame 27 may have a monolithic construction of a resin material, may be made up of separate parts made from a resin material, may be made of a metal plate subjected to press working, or may be made up of separate parts made of metal plates.

The light source driving circuit board 28 incorporates electronic circuits and/or electric circuits for driving the light sources 22. When fluorescent tubes are used for the light sources 22, the light source driving circuit board 28 incorporates inverter circuits.

The light source driving circuit board cover 29 has the shape of a plate, or a tray of low height to cover the light source driving circuit board 28. The light source driving circuit board cover 29 is arranged to protect the light source driving circuit board 28 and prevent unnecessary radiation from the light source driving circuit board 28. For this purpose, the light source driving circuit board cover 29 is made from a conductor such as metal.

Next, a description of assembly of the light source device 2a including these components will be provided.

The description is provided with reference to FIG. 4. The reflection sheet 21 is laid on the front side of the bottom 111 of the chassis 11a. The light sources 22 are arranged in parallel on the front side of the reflection sheet 21. The light sources 22 are held by the lamp clips 23 and fixed to the front side of the bottom 111 of the chassis 11a. The side holders 24 are disposed along the shorter sides of the chassis 11a so as to cover the both end portions (electrode portions) of the light sources 22. The thin-plate-shaped optical member 25 is laid on the front side of the side walls 112 of the chassis 11a and the front side of the side holders 24.

The sheet-shaped or film-shaped optical member 26 is laid on the front side of the thin-plate-shaped optical member 25. Specifically, the sheet-shaped or film-shaped optical member 26 is laid on the thin-plate-shaped optical member 25, and the fitting protrusions (hooks) 114 protruding from the chassis 11a are fit in the fitting holes 26 of the sheet-shaped or film-shaped optical member 26. According to this configuration, the sheet-shaped or film-shaped optical member 26 is hung on the fitting protrusions (hooks) 114 protruding from the chassis 11a in the normal usage state.

Then, the frame 27 is attached to the front side of the chassis 11a. The light source driving circuit board 28 is disposed on the back side of the chassis 11a. The light source driving circuit board cover 29 is disposed so as to cover the light source driving circuit board 28.

With this configuration, even if the vertical positions of the fitting holes 261 in the sheet-shaped or film-shaped optical member 26 are not precisely aligned, the fitting protrusions (hooks) 114 move vertically so that the inner surfaces of the fitting holes 261 and the fitting protrusions (hooks) 114 come into contact with one another, and the weight of the sheet-shaped or film-shaped optical member 26 is dispersed on the inner surfaces of the fitting holes 261. Thus, even if the vertical positions of the fitting holes 261 in the sheet-shaped or film-shaped optical member 26 are not precisely aligned, concentration of the weight of the sheet-shaped or film-shaped optical member 26 on the peripheral portions of specific fitting holes 261 is prevented or minimized. Consequently, occurrence of wrinkle or warpage caused by concentration of the weight can be prevented or minimized.

Figure 5:
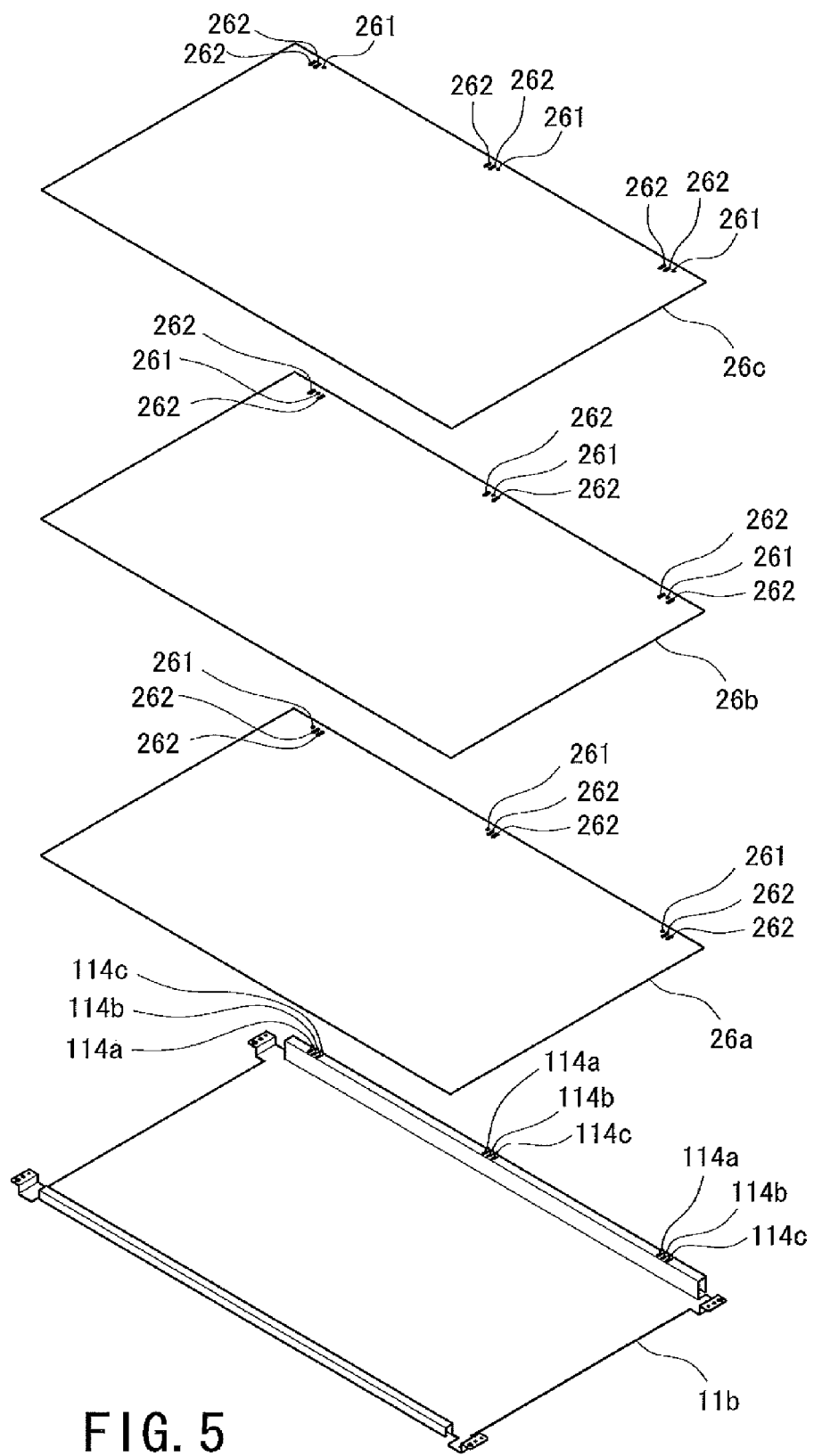
FIG. 5 is an exploded perspective view showing a relation between a plurality of sheet-shaped or film-shaped optical members and fitting protrusions (hooks) protruding from a chassis for a light source device according to a second preferred embodiment of the present invention.

Next, a description of a light source device 2b according to a second preferred embodiment of the present invention will be provided. The light source device 2b according to the second preferred embodiment of the present invention includes a plurality of sheet-shaped or film-shaped optical members 26a, 26b, and 26c. FIG. 5 is an exploded perspective view schematically showing a relation between the plurality of sheet-shaped or film-shaped optical members 26a, 26b, and 26c and the fitting protrusions (hooks) 114 protruding from a chassis 11b. Shown in FIG. 5 is a configuration in which three sheet-shaped or film-shaped optical members are used. For the purpose of illustration, the three sheet-shaped or film-shaped optical members are referred to as the first optical member 26a, the second optical member 26b, and the third optical member 26c.

As shown in FIG. 5, the chassis 11b for the light source device 2b according to the second preferred embodiment of the present invention includes a plurality of fitting protrusions (hooks) 114a arranged to hang the first optical member 26a, a plurality of fitting protrusions (hooks) 114b arranged to hang the second optical member 26b, and a plurality of fitting protrusions (hooks) 114c arranged to hang the third optical member 26c. The overall configuration of the chassis 11b and the configuration of the fitting protrusions (hooks) 114a, 114b, and 114c are the same as those of the chassis 11a for the light source 2a according to the first preferred embodiment of the present invention, and descriptions of the configurations are omitted.

Each of the first optical member 26a, the second optical member 26b, and the third optical member 26c includes a plurality of fitting holes 261 and a plurality of loosely fitting holes 262. The fitting protrusions (hooks) 114a, the fitting protrusions (hooks) 114b, and the fitting protrusions (hooks) 114c of the chassis 11b are fit in the plurality of fitting holes 261 of the first optical member 26a, the second optical member 26b, and the third optical member 26c, respectively, and the fitting protrusions (hooks) 114a, the fitting protrusions (hooks) 114b, and the fitting protrusions (hooks) 114c of the chassis 11b are loosely fit in the plurality of loosely fitting holes 262 of the first optical member 26a, the second optical member 26b, and the third optical member 26c, respectively. Specifically, the first optical member 26a includes the plurality of fitting holes 261 in which the plurality of fitting protrusions (hooks) 114a arranged to hang the first optical member 26a of the chassis 11b are fit, the plurality of loosely fitting holes 262 in which the plurality of fitting protrusions 114b (hooks) arranged to hang the second optical member 26b are loosely fit, and the plurality of loosely fitting holes 262 in which the plurality of fitting protrusions (hooks) 114c arranged to hang the third optical member 26c are loosely fit. The second optical member 26b includes the plurality of fitting holes 261 in which the plurality of fitting protrusions (hooks) 114b arranged to hang the second optical member 26b of the chassis 11b are fit, the plurality of loosely fitting holes 262 in which the plurality of fitting protrusions (hooks) 114a arranged to hang the first optical members 26a are loosely fit, and the plurality of loosely fitting holes 262 in which the plurality of fitting protrusions (hooks) 114c arranged to hang the third optical member 26c are loosely fit. The third optical member 26c includes the plurality of fitting holes 261 in which the plurality of fitting protrusions (hooks) 114c arranged to hang the third optical member 26c of the chassis 11b are fit, the plurality of loosely fitting holes 262 in which the plurality of fitting protrusions (hooks) 114a arranged to hang the first optical member 26a are loosely fit, and the plurality of loosely fitting holes 262 in which the plurality of fitting protrusions (hooks) 114b arranged to hang the second optical member 26b are loosely fit.

By fitting the fitting protrusions 114a, the fitting protrusions 114b, and the fitting protrusions 114c in the fitting holes 261 of the first optical member 26a, the second optical member 26b, and the third optical member 26c, respectively, the sheet-shaped or film-shaped optical members 26a, 26b, 26c are hung on the fitting protrusions 114a, 114b, and 114c. The loosely fitting holes 262 have such a size that the fitting protrusions 114a, 114b, and 114c are loosely fit in the loosely fitting holes 262 but do not come into contact with the inner surfaces of the loosely fitting holes 262. For example, vertically long holes in the normal usage state can be used for the loosely fitting holes 262.

With this configuration, when the chassis 11b is in the state of being normally used, the first optical member 26a is hung on the fitting protrusions (hooks) 114a arranged to hang the first optical member 26a of the chassis 11b, and the fitting protrusions (hooks) 114b arranged to hang the second optical member 26b and the fitting protrusions (hooks) 114c arranged to hang the third optical member 26c are loosely fit in the loosely fitting holes 262 of the first optical member 26a and do not come into contact with the first optical member 26a (i.e., the fitting protrusions (hooks) 114b and the fitting protrusions (hooks) 114c do not contribute to the hanging of the first optical member 26a). The second optical member 26b is hung on the fitting protrusions (hooks) 114b arranged to hang the second optical member 26b of the chassis 11b, and the fitting protrusions (hooks) 114a arranged to hang the first optical member 26a and the fitting protrusions (hooks) 114c arranged to hang the third optical member 26c are loosely fit in the loosely fitting holes 262 of the second optical member 26b and do not come into contact with the second optical member 26b (i.e., the fitting protrusions (hooks) 114a and the fitting protrusions (hooks) 114c do not contribute to the hanging of the second optical member 26b). The third optical member 26c is hung on the fitting protrusions (hooks) 114c arranged to hang the third optical member 26c of the chassis 11b, and the fitting protrusions (hooks) 114a arranged to hang the first optical member 26a and the fitting protrusions (hooks) 114b arranged to hang the second optical member 26b are loosely fit in the loosely fitting holes 262 of the third optical member 26c and do not come into contact with the third optical member 26c (i.e., the fitting protrusions (hooks) 114a and the fitting protrusions (hooks) 114b do not contribute to the hanging of the third optical member 26c).

As a result, the first optical member 26a, the second optical member 26b, and the third optical member 26c are hung on the fitting protrusions (hooks) 114a, the fitting protrusions (hooks) 114b, and the fitting protrusions (hooks) 114c, respectively. Because the fitting protrusions (hooks) 114a, 114b, and 114c are vertically movable, the same action and effect as the light source device 2a according to the first preferred embodiment of the present invention are achieved in each of the first optical member 26a, the second optical member 26b, and the third optical member 26c. Thus, the configuration of including the plurality of sheet-shaped or film-shaped optical members 26a, 26b, and 26c achieves the same action and effect as the light source device 2a according to the first preferred embodiment of the present invention.

The number of sheet-shaped or film-shaped optical members is not limited to three. Two sheet-shaped or film-shaped optical members or four or more sheet-shaped or film-shaped optical members may be used. Specifically, when the number of sheet-shaped or film-shaped optical members is N (N is a natural number excluding zero), fitting protrusions (hooks) arranged to hang the N pieces of sheet-shaped or film-shaped optical members are provided. The nth sheet-shaped or film-shaped optical member (n=1, . . . , n, i.e., n is a natural number that satisfies N) includes fitting holes in which given fitting protrusions are fit and loosely fitting holes in which given fitting protrusions are loosely fit. When the sheet-shaped or film-shaped optical members are laid on one another, the loosely fitting holes of one sheet-shaped or film-shaped optical member coincide with the loosely fitting holes of the other sheet-shaped or film-shaped optical members, and the loosely fitting holes of one sheet-shaped or film-shaped optical member coincide with the fitting holes of the other sheet-shaped or film-shaped optical members, but the fitting holes of one sheet-shaped or film-shaped optical member do not coincide with the fitting holes of the other sheet-shaped or film-shaped optical members. Owing to this configuration, the number of sheet-shaped or film-shaped optical members is not limited.

Figure 6:
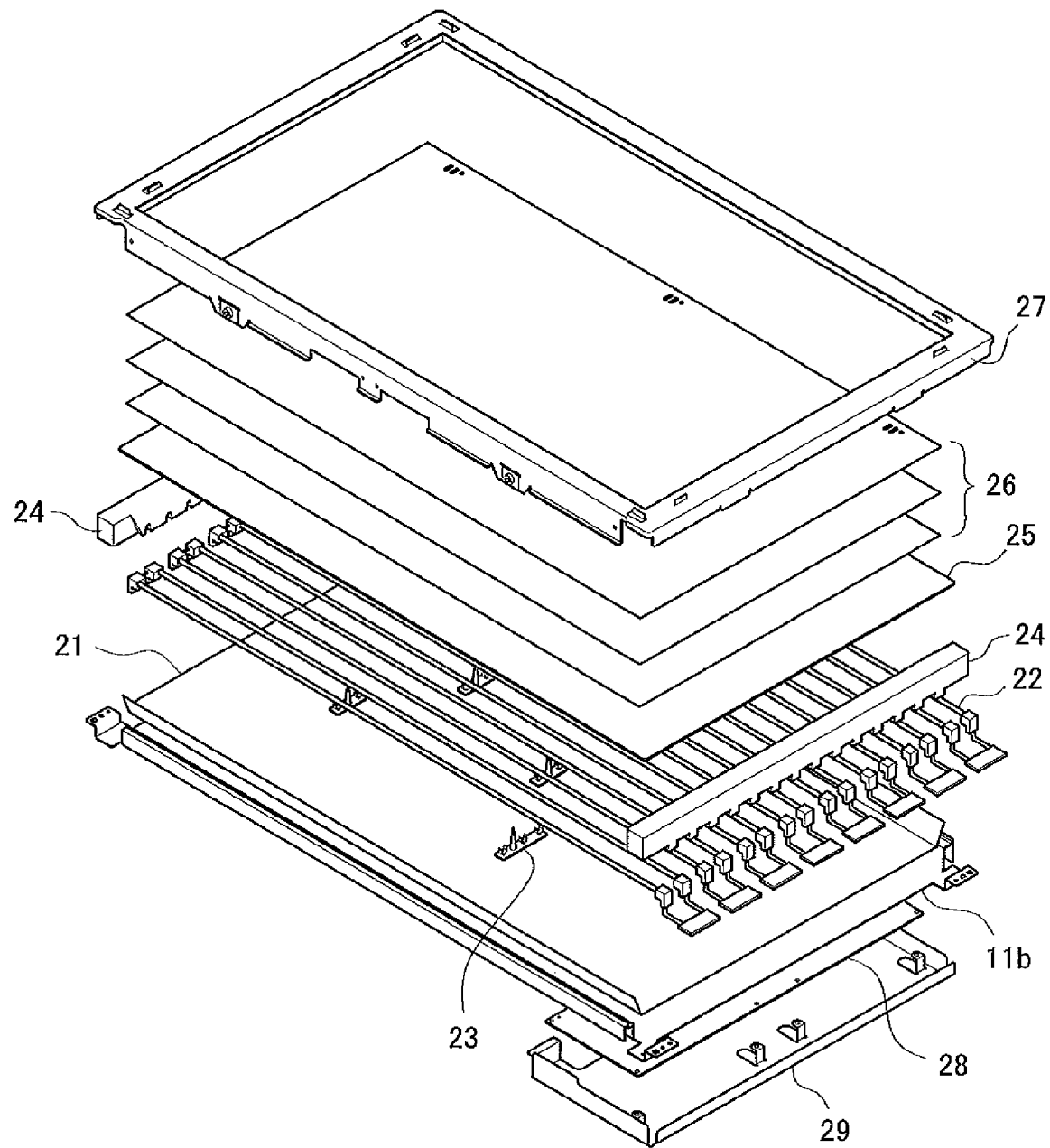
FIG. 6 is an exploded perspective view showing a schematic configuration of the light source device according to the second preferred embodiment of the present invention.

FIG. 6 is an exploded perspective view showing a schematic configuration of the light source device 2b according to the second preferred embodiment of the present invention. For the same elements as the light source device 2a according to the first preferred embodiment of the present invention, the same numerals are used, and their descriptions are omitted. In FIG. 6, the front side of the light source device 2b according to the second preferred embodiment of the present invention faces toward the top of FIG. 6, and the back side faces toward the bottom of FIG. 6.

The light source device 2b according to the second preferred embodiment of the present invention includes the chassis 11b according to the preferred embodiment of the present invention, the reflection sheet 21, the light sources 22, the lamp clips 23, the side holders 24, the thin-plate-shaped optical member 25, a plurality of sheet-shaped or film-shaped optical members (in FIG. 6, three sheet-shaped or film-shaped optical members 26a, 26b, and 26c), the frame 27, the light source driving circuit board 28, and the light source driving circuit board cover 29. These elements except for the sheet-shaped or film-shaped optical members 26a, 26b, and 26c are the same as those of the light source device 2a according to the first preferred embodiment of the present invention, and their descriptions are omitted.

A diffusion sheet, a lens sheet, or a reflective polarizing sheet is preferably used for the sheet-shaped or film-shaped optical members 26a, 26b, and 26c. The fitting holes 261 in which the fitting protrusions (hooks) 114a, 114b, and 114c protruding from the chassis 11b are fit and the loosely fitting holes 262 in which the fitting protrusions (hooks) 114a, 114b, and 114c are loosely fit are disposed adjacent to one longer sides (the upper sides in the normal usage state) of the sheet-shaped or film-shaped optical members 26a, 26b, and 26c. The number, size, position, and shape of the fitting holes 261 and the loosely fitting holes 262 are determined in accordance with those of the fitting protrusions (hooks) 114a, 114b, and 114c protruding from the chassis 11b. When the fitting protrusions (hooks) 114a, 114b, and 114c are fit in the fitting holes of the sheet-shaped or film-shaped optical members, the loosely fitting holes 262 do not come into contact with the fitting protrusions (hooks) 114a, 114b, and 114c that are loosely fit therein (i.e., the weight of the sheet-shaped or film-shaped optical members 26a, 26b, and 26c is not put on those fitting protrusions (hooks) 114a, 114b, and 114c).

When the sheet-shaped or film-shaped optical members 26a, 26b, and 26c are laid on one another, the loosely fitting holes 262 of one sheet-shaped or film-shaped optical member coincide with the loosely fitting holes 262 of the other sheet-shaped or film-shaped optical members or the loosely fitting holes 262 of one sheet-shaped or film-shaped optical member coincide with the fitting holes 261 of the other sheet-shaped or film-shaped optical members, but the fitting holes 261 of one sheet-shaped or film-shaped optical member do not coincide with the fitting holes 261 of the other sheet-shaped or film-shaped optical members. With this configuration, the fitting protrusions (hooks) 114a, the fitting protrusions (hooks) 114b, and the fitting protrusions (hooks) 114c hang the first optical member 26a, the second optical member 26b, and the third optical member 26c, respectively, and do not contribute to the hanging of the other sheet-shaped or film-shaped optical members. Accordingly, the same action and effect as the light source device 2a according to the first preferred embodiment of the present invention are achieved in each of the sheet-shaped or film-shaped optical members 26a, 26b, and 26c.

Next, a description of assembly of the light source device 2b including these components will be provided.

The description is provided with reference to FIG. 6. The reflection sheet 21 is laid on the front side of the bottom 111 of the chassis 11b. The light sources 22 are arranged in parallel on the front side of the reflection sheet 21. The light sources 22 are held by the lamp clips 23 and fixed to the front side of the bottom 111 of the chassis 11b. The side holders 24 are disposed along the shorter sides of the chassis 11b so as to cover the both end portions (electrode portions) of the light sources 22. The thin-plate-shaped optical member 25 is laid on the front side of the side walls 112 of the chassis 11b and the front side of the side holders 24.

The sheet-shaped or film-shaped optical members 26a, 26b, and 26c are laid on the front side of the thin-plate-shaped optical member 25. Specifically, the sheet-shaped or film-shaped optical members 26a, 26b, and 26c are laid on the thin-plate-shaped optical member 25, and the fitting protrusions (hooks) 114a, 114b, and 114c protruding from the chassis 11b are fit in the fitting holes 261 and the loosely fitting holes 262 of the sheet-shaped or film-shaped optical members 26a, 26b, and 26c.

Specific combinations of the thin-plate-shaped optical member 25 and the sheet-shaped or film-shaped optical members 26a, 26b, and 26c include (1) a combination of a diffusion plate as the thin-plate-shaped optical member 25, and a diffusion sheet, a lens sheet, and a reflective polarizing sheet that are used for the sheet-shaped or film-shaped optical members 26a, 26b, and 26c, where the diffusion plate, the diffusion sheet, the lens sheet, and the reflective polarizing sheet are layered in this order from the back side of the light source device 2b, (2) a combination of a diffusion plate that is used as the thin-plate-shaped optical member 25, and a reflective polarizing sheet and two diffusion sheets that are used for the sheet-shaped or film-shaped optical members 26a, 26b, and 26c, where the diffusion plate, the two diffusion sheets, and the reflective polarizing sheet are layered in this order from the back side of the light source device 2b, (3) a combination of a diffusion plate that is used as the thin-plate-shaped optical member 25, and a lens sheet and two diffusion sheets that are used as the sheet-shaped or film-shaped optical members 26a, 26b, and 26c, where the diffusion plate, the first diffusion sheet, the lens sheet, and the second diffusion sheet are layered in this order from the back side of the light source device 2b, and (4) a combination of a diffusion plate that is used as the thin-plate-shaped optical member 25, and one, two, or three diffusion sheets that are used as the sheet-shaped or film-shaped optical members 26a, 26b, and 26c, where the diffusion plate and the given number of diffusion sheets (one, two, or three) are layered in this order from the back side of the light source device 2b.

The combination of the thin-plate-shaped optical member 25 and the sheet-shaped or film-shaped optical members 26a, 26b, and 26c is not limited to the combinations described above. The combination is preferably determined according to the kinds of the light source device 2b and the display device.

Then, the frame 27 is attached to the front side of the chassis 11b. The light source driving circuit board 28 is disposed on the back side of the chassis 11b. The light source driving circuit board cover 29 is disposed so as to cover the light source driving circuit board 28.

With this configuration, even if the vertical positions of the fitting holes 261 of the sheet-shaped or film-shaped optical members 26a, 26b, and 26c are not precisely aligned, the fitting protrusions (hooks) 114a, 114b, and 114c move vertically so that the inner surfaces of the fitting holes 261 and the fitting protrusions (hooks) 114a, 114b, and 114c come into contact with one another, and the weight of the sheet-shaped or film-shaped optical members is dispersed to the peripheral portions of the fitting holes 261. Thus, even if the vertical positions of the fitting holes 261 of the sheet-shaped or film-shaped optical members 26a, 26b, and 26c are not precisely aligned, concentration of the weight of the sheet-shaped or film-shaped optical members 26a, 26b, and 26c on the peripheral portions of specific fitting holes 261 is prevented or minimized. Consequently, occurrence of wrinkle or warpage caused by concentration of the weight can be prevented or minimized.

Also in the configuration of including the sheet-shaped or film-shaped optical members 26a, 26b, and 26c, the same action and effect as the light source device 2a according to the first preferred embodiment of the present invention are achieved in each of the sheet-shaped or film-shaped optical members 26a, 26b, and 26c.

Figure 7:
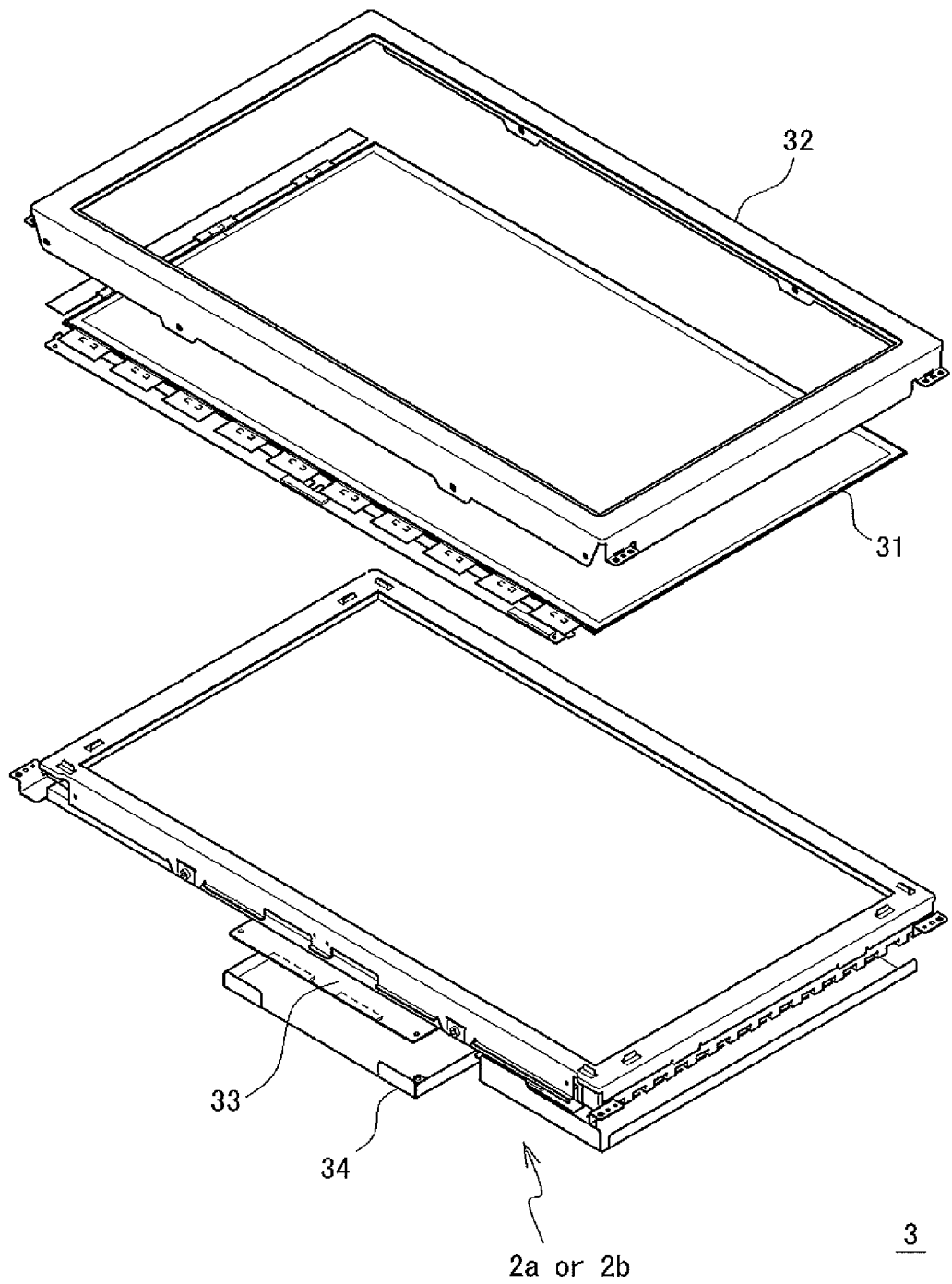
FIG. 7 is an exploded perspective view showing a schematic configuration of a display device according to a preferred embodiment of the present invention.

Next, a description of a display device 3 including the light source device according to the preferred embodiments of the present invention (i.e., the display device 3 according to one of the preferred embodiments of the present invention) will be provided. FIG. 7 is an exploded perspective view showing a schematic configuration of the display device 3 according to the preferred embodiment of the present invention.

As shown in FIG. 7, the display device 3 according to the preferred embodiment of the present invention includes the light source device 2a according to the first preferred embodiment of the present invention or the light source device 2b according to the second preferred embodiment of the present invention, a display panel 31, a bezel 32, a control circuit board 33, and a control circuit board cover 34.

A variety of conventional transmissive display panels can be used for the display panel 31. For example, a generally used transmissive active matrix liquid crystal display panel can be used. The bezel 32 has the function of supporting and/or protecting the display panel 31. As shown in FIG. 7, the bezel 32 has a substantially square shape with an opening. The control circuit board 33 incorporates electronic circuits and/or electric circuits for generating a control signal to drive the display panel 31 based on a signal inputted from the outside (e.g., a tuner). The control circuit board cover 34 has the shape of a plate, or a tray of low height to cover the control circuit board 33. The control circuit board cover 34 is arranged to protect the control circuit board 33 and prevent unnecessary radiation from the control circuit board 33.

Next, a description of assembly of the display device 3 according to the preferred embodiment of the present invention will be provided. The display panel 31 is disposed on the front side of the frame 27 of the light source device 2a according to the first preferred embodiment of the present invention or the light source device 2b according to the second preferred embodiment of the present invention. Then, the bezel 32 is attached to the front side of the display panel 31. Thus, the display panel 31 is interposed between the frame 27 of the light source device 2a according to the first preferred embodiment of the present invention or the light source device 2b according to the second preferred embodiment of the present invention and the bezel 32. The control circuit board 33 is disposed on the back side of the chassis 11a or 11b of the light source device 2a according to the first preferred embodiment of the present invention or the light source device 2b according to the second preferred embodiment of the present invention. The control circuit board cover 34 is disposed so as to cover the control circuit board 33.

In the display device 3 having the configuration described above, the light emitted from the light source device 2a according to the first preferred embodiment of the present invention or the light source device 2b according to the second preferred embodiment of the present invention passes through the display panel 31 and makes an image displayed visible on the front side of the display panel 31. As described above, occurrence of wrinkle or warpage in the sheet-shaped or film-shaped optical members 26, 26a, 26b, and 26c is prevented or minimized. Consequently, the display device 3 according to the preferred embodiment of the present invention achieves high-definition image display without irregular brightness or shadow.

Figure 8:
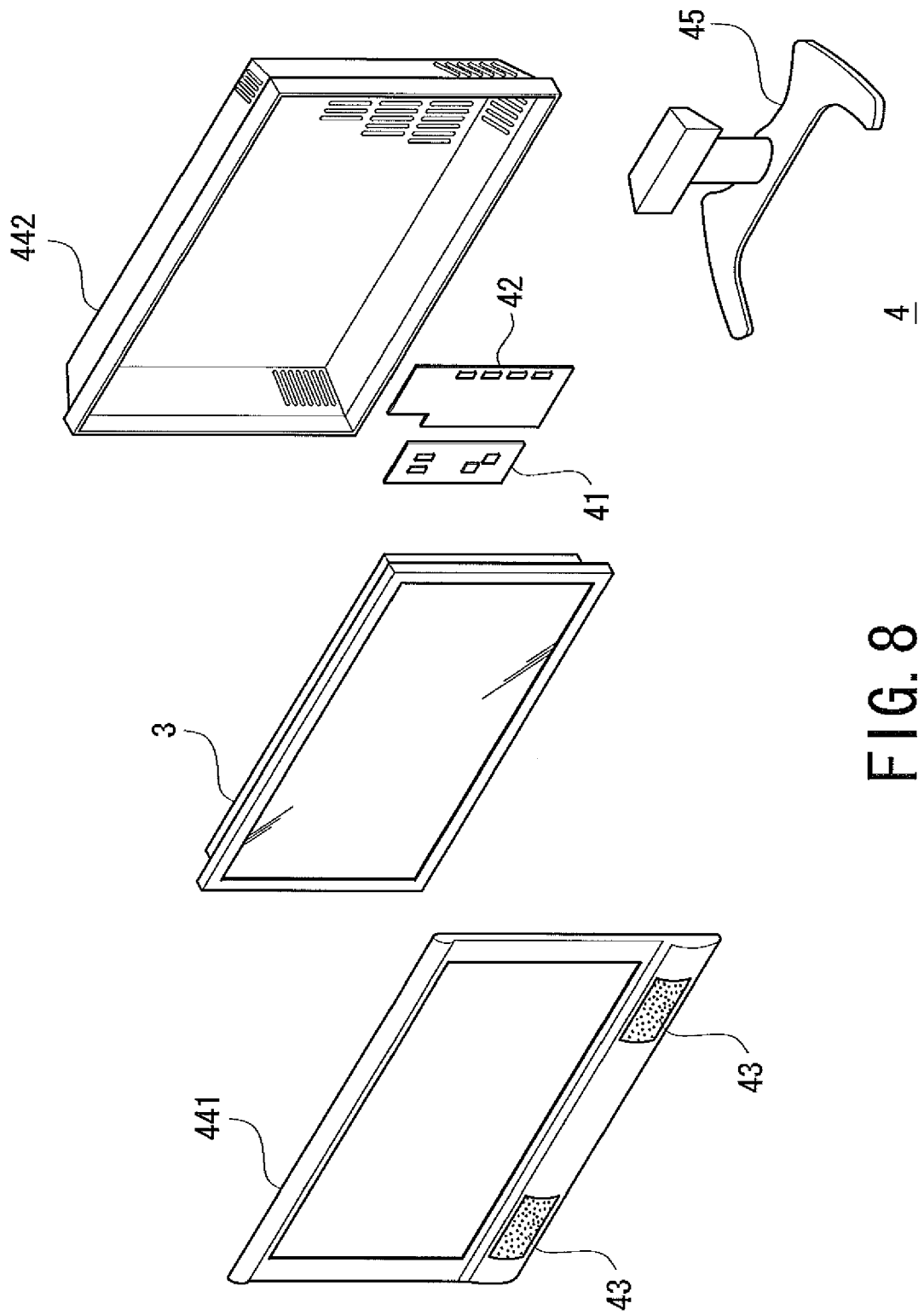
FIG. 8 is an exploded perspective view showing a schematic configuration of a television receiver including the display device according to the preferred embodiment of the present invention.

Next, a brief description of a television receiver 4 including the display device 3 according to the preferred embodiment of the present invention will be provided. FIG. 8 is an exploded perspective view showing a schematic configuration of the television receiver 4 including the display device 3 according to the preferred embodiment of the present invention. The television receiver 4 includes the display device 3 according to the preferred embodiment of the present invention, an electric power supply 41, a tuner 42, loudspeaker units 43, a cabinet 441, 442, and a supporting member 45.

The electric power supply 41 is arranged to supply electric power to the display device 3 according to the preferred embodiment of the present invention, the tuner 42, and other components.

The tuner 42 is arranged to produce an image signal and a sound signal of a given channel based on a received radio wave and a signal inputted from the outside. A conventional terrestrial tuner (analog, digital, or both), a BS tuner, a CS tuner may be used for the tuner 42.

The display device 3 according to the preferred embodiment of the present invention is arranged to display an image based on the image signal of the given channel produced by the tuner 42. The loudspeaker units 43 are arranged to produce a sound based on the sound signal produced by the tuner 42. A variety of conventional loudspeaker units such as generally used speakers may be used for the loudspeaker unit 43.

The display device 3 according to the preferred embodiment of the present invention, the electric power supply 41, the tuner 42, and the loudspeaker units 43 are housed in the cabinet (the cabinet in FIG. 8 consists of the front side cabinet 441 and the back side cabinet 442) that is supported by the supporting member 45. The television receiver 4 is not limited to this configuration. For example, the electric power supply 41, the tuner 42, and the loudspeaker units 43 may be mounted on the display device 3 according to the preferred embodiment of the present invention.

The foregoing descriptions of the preferred embodiments of the present invention have been presented for purposes of illustration and description with reference to the drawings. However, it is not intended to limit the present invention to the preferred embodiments, and modifications and variations are possible as long as they do not deviate from the principles of the present invention.

For example, although the coil springs or the leaf springs are used for the pushing mechanisms in the above described preferred embodiments of the present invention, the pushing mechanisms are not limited to the coil springs and may be air springs or torsion bars.

The invention claimed is:
1. A light source device comprising:
a sheet-shaped optical member that is arranged to control properties of light that passes therethrough, and includes a plurality of fitting holes each having a shape of a through hole, the plurality of fitting holes being disposed adjacent to an upper side of the sheet-shaped optical member in a normal usage state; and
a chassis to which the sheet-shaped optical member is attached, and that includes a plurality of fitting protru- sions that are vertically movable, and pushing mechanisms arranged to push the plurality of fitting protrusions upward in the normal usage state; wherein the sheet-shaped optical member is hung on the plurality of fitting protrusions of the chassis such that the plurality of fitting protrusions are fit in the plurality of fitting holes of the sheet-shaped optical member; and an upwardly pushing force of the pushing mechanisms and a total weight of the sheet-shaped optical member are in balance in the normal usage state.

2. The light source device according to claim 1, wherein the pushing mechanisms comprise coil springs or leaf springs.

3. A light source device comprising:

a plurality of sheet-shaped optical members that are arranged to control properties of light that passes therethrough, and include a plurality of fitting holes each having a shape of a through hole, and a plurality of loosely fitting holes, the plurality of fitting holes and the plurality of loosely fitting holes being disposed adjacent to upper sides of the plurality of sheet-shaped optical members in a normal usage state; and a chassis to which the plurality of sheet-shaped optical members are attached, and that includes a plurality of fitting protrusions that are vertically movable, and pushing mechanisms arranged to push the plurality of fitting protrusions upward in the normal usage state, wherein one of the plurality of sheet-shaped optical members is hung on some of the plurality of fitting protrusions of the chassis such that the some of the plurality of fitting protrusions are fit in the plurality of fitting holes in the one of the sheet-shaped optical members, while some others or all others of the plurality of fitting protrusions of the chassis are loosely fit in the plurality of loosely fitting holes in the one of the sheet-shaped optical members, and another one of the sheet-shaped optical members is hung on the some others or the all others of the plurality of fitting protrusions of the chassis such that the some others or the all others of the plurality of fitting protrusions of the chassis are fit in the plurality of fitting holes of the another one of the sheet-shaped optical members, while the some of the plurality of fitting protrusions of the chassis are loosely fit in the plurality of loosely fitting holes of the another one of the sheet-shaped optical members.

4. The light source device according to claim 3, wherein the pushing mechanisms comprise coil springs or leaf springs.

5. A display device comprising:
the light source device according to claim 1; and
a liquid crystal display panel.

6. A display device comprising:
the light source device according to claim 3; and
a liquid crystal display panel.

* * * * *